United States Patent Office 3,077,955
Patented Feb. 19, 1963

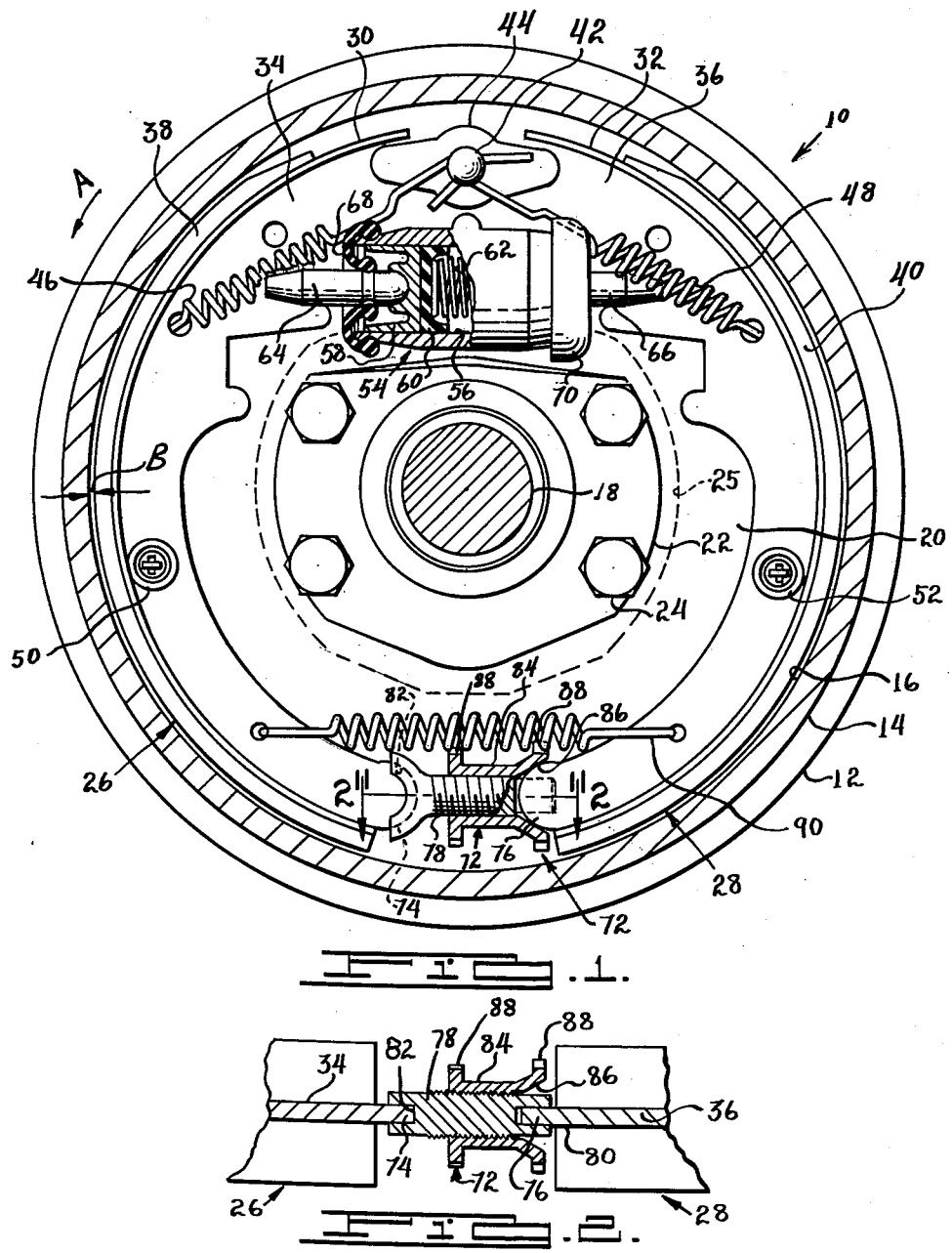

3,077,955
BRAKE ADJUSTMENT LINK
Harmond E. Berno, Farmington, Mich., assignor to Ford Motor Company, Dearborn, Mich., a corporation of Delaware
Continuation of application Ser. No. 833,225, Aug. 12, 1959. This application Jan. 22, 1962, Ser. No. 167,875
2 Claims. (Cl. 188—79.5)

The present invention relates generally to brakes and more particularly to a manual adjustment device for expanding internal shoe brakes.

This application is a continuation of my copending application Serial Number 833,225, filed August 12, 1959, now abandoned.

It is well known in the art that in brakes of the type employing a pair of rigid brake shoes which are forcibly separated to press against a cylindrical internal brake drum, that the friction lining carried by the shoes is worn away by use and compensating adjustments must be made to maintain the proper clearance between the lining when the shoes are retracted to a deactivated position and the drum. Failure to make the necessary adjustment will result in excessive brake shoe movement. If the subject brakes form a part of a motor vehicle having pedal actuated brake shoes, then uncompensated lining wear will be evidenced by excessive free pedal travel to merely bring the brake lining in contact with the drums, let alone move the shoes with sufficient force to effect a braking action.

For the foregoing reasons, it is now common to provide means for periodically adjusting the position of the brake shoes relative to the drum in order to maintain or re-establish a minimum clearance with the lining. Prior to the present invention, such means have been relatively expensive because of their multiplicity of parts which reflects in the labor cost of the original assembling of the brake.

Therefore, it is an object of this invention to provide an adjusting device for internal expanding shoe brakes that is characterized by its simplicity, ease of assembly and economy of manufacture. Broadly, this invention comprises means for adjusting the clearance of the brake lining from the brake drum by controlling the separation of the adjacent free ends of the brake shoes. In the illustrated preferred embodiment, the ends of the brake shoes are connected by a floating adjustment mechanism which has a threaded member with a semi-socket engaging a rounded end on the web of one of the shoes and a diametral slot for engagement with the web of the other shoe. A nut is threadably carried by the first member and has a hemispherical socket which bears against a rounded end on the web of the said other shoe.

Among the distinctive features of the present invention which will become apparent from the following detailed discussion and the accompanying drawings described below, is the fact that the adjusting device is of only two part construction and can be manufactured economically by means such as the maximum use of screw machine operations.

FIGURE 1 is an elevational view partly in section showing an internal expanding shoe brake assembly incorporating the present invention; and, FIGURE 2 is a plan view partly in section taken along section lines 2—2 of FIGURE 1 disclosing the floating adjustment device.

Referring now to the drawings for a more detailed disclosure of the present invention, FIGURE 1 shows a brake assembly 10 incorporating its preferred embodiment. The illustrated brake assembly 10 is for the front wheel of a motor vehicle and of a type commonly known as a duo-servo brake because of its self-energizing action in both forward and reverse rotation. However, it will be appreciated that this invention is equally adaptable to brakes of other types and applications by elementary modifications that are well within the skill of those in the art.

Brake assembly 10 is comprised of a brake drum 12 having a cylindrical portion 14 shown in section. Portion 14 has an internal braking surface 16 with which the friction elements coact. The brake drum 12 is affixed to rotate with a road wheel (not shown) that in turn is rotatably mounted on a wheel spindle 18.

The supporting structure for the brake's actuating mechanism consists of a backing plate 20 and a retaininge plate 22 which are both secured by bolts 24 to a flange 25 carried by the spindle structure 18.

Movably affixed to the backing plate 20 are primary and secondary brake shoes 26 and 28. The primary and secondary status of the shoes 26, 28 is predicated upon counterclockwise rotation of drum 12 as indicated by the arrow A. Shoes 26, 28 are composed of rim portions 30 and 32 which have a configuration of a segment of a cylinder and web portions 34, 36 to reinforce the rims 30, 32. Frictional linings 38, 40 are secured to the rims 30, 32 by either rivets or a bonding process.

The upper ends of the webs 34, 36 of the shoes 26, 28 are provided with notches (not shown) which engage a pin 42 of an anchor assembly 44. Retaining springs 46, 48 are interposed between the anchor pin 42 and the webs 34, 36 respectively in order to draw the shoes into engagement with the pin 42. Spring clips 50, 52 join the webs 34, 36 to the backing plate and provide a flexible connection to maintain the shoes in their proper lateral position.

A hydraulic wheel cylinder assembly 54 is secured to the backing plate 20 and is provided with a cylindrical bore 56. Slidably received within the bore 56 are a pair of opposed pistons 58, only one of which is shown. Located inwardly of the pistons 58 in the bore 56 are cup-shaped rubber sealing elements 60. A spring 62 is interposed between the two cups 60 to urge them to a separated position. The outboard ends of the pistons 58 are connected to the webs 34, 36 by means of links 64, 66 and rubber caps 68, 70 are located about the links 64, 66 and over the open ends of the bore 56 to prevent the entry of contaminants.

The foregoing described wheel cylinder 54 is of relatively conventional configuration and function. Hydraulic fluid under pressure is introduced in the bore 56 between the cups 60 which moves the pistons 58 outwardly. This movement is transmitted through the links 64, 66 to the shoes 26, 28 forcing them to separate and press against the braking surface 16.

An adjustment mechanism 72 is provided interposed between the lower ends of the brake shoe webs 32, 36 which can serve the dual purposes of adjusting the separation between the webs 34, 36 and transmitting forces from one shoe to the other. The lower adjacent ends of the webs 34, 36 are formed with flat rounded ends 74, 76 to complement the ends of the mechanism 72 which they contact. It will be noted from the drawing that both the primary and secondary brake shoes 26, 28 are identical in configuration and may be interchanged one for the other.

The adjustment device 72 is comprised of but two components, one an inner member 78 which is externally threaded and has a diametral slot 80 at one end that engages the rounded end 76 of the flat web 36. The other end of inner member 78 has a semi-socket 82 that complements the end 74 of web 34. As seen in FIGURE 2, socket 82 has a straight slotted configuration in plan view and a semi-circular recess in elevational view (FIGURE 1).

A nut member 84 rides on the threads of inner member 78 and has a hemispherical socket 86 on the end that bears against the end 76 of web 36. The nut 84 is formed with a pair of serrated radial flanges 88. Attached to and extending between the two lower ends of the webs 34, 36 is a retracting spring 90 to draw the web ends 74, 76 into contact with the socket 82 of member 78 and socket 86 of nut 84 respectively.

From the drawings and foregoing description, it is apparent that the device 72 is a free floating adjustment link between the adjacent ends 74, 76 of the shoes 26, 28. By rotating the nut 84 on member 78, the axial length of the adjusting link 72 may be varied to change the amount of separation of the ends 74, 78 which in turn varies the clearance B between the lingings 38, 40 and surface 16.

In operation, application of hydraulic fluid pressure to the bore 56 will cause the upper ends of the brake shoes 26, 28 to be separated until the linings 38, 40 come in contact with the braking surface 16. Assuming that the brake drum 12 is rotating in a counterclockwise direction as indicated by arrow A, when shoe 26 frictionally meets the braking surface 16 it will tend to rotate with the drum 12. The force corresponding to that movement will be transmitted through the adjustment device 72 to the end 76 of shoe 28. When the lining 40 is engaged with the surface 16, it will also be urged by that engagement and additionally by the force transmitted to it from shoe 26 in a counterclockwise direction against the anchor pin 42. Upon the application of the brakes as described, anchor pin 42 functions as a reactive point for the braking forces. Further application of hydraulic pressure will increase the rubbing friction between the linings 38, 40 and the surface 16 until the retarding forces stop the rotation of the drum. When the hydraulic pressure is relieved, the springs 46, 48 and 90 retract the shoes 26, 28 away from the drum 12 to a deactivated position.

After repeated applications of the brakes, the linings 38 and 40 will be reduced by wear so that the clearance B between the linings 38, 40 and the braking surface 16 will be undesirably increased. After such lining wear, subsequent application of the brakes will require an increased free travel of the shoes 26, 28 merely to bring the lining into engagement with the surface 16. To compensate for such wear, the correct clearance B may be re-established by rotating the nut 84 of adjustment device 72 so that axial length of the device 72 will be increased bringing the clearance B back to its correct dimension.

The retaining spring 90 serves not only to keep the ends 74, 76 in contact with the device 72 but also it is in contact with the serrations of the flange 88 to prevent the nut 84 from being inadvertently rotated. Thus, once the correction clearance is established by the proper positioning of the nut 84, the separation of the shoes 26, 28 will be maintained. Sufficient threaded engagement length between member 78 and the nut 84 permits several adjustments to be made during the life of the brake linings 38 and 40.

The foregoing description constitutes the preferred embodiment of the present invention. However, variations may occur to those skilled in the art which will come within the scope and spirit of the following claims.

I claim:

1. A brake assembly having a backing plate; an anchor pin and a hydraulic wheel cylinder secured to said backing plate; a pair of radially movable arcuate brake shoes secured to said backing plate; said shoes being of identical interchangeable configuration and each having a sheet metal reinforcing web; said shoe webs having one pair of adjacent ends engaging said anchor pin; spring means urging said shoe webs into engagement with said anchor pin; said wheel cylinder operatively engaging said shoe webs near said one pair of adjacent ends; said shoe webs having a second pair of adjacent ends; said second web ends each having flat semi-circular integral portions oriented in opposed relationship; a two-piece extendable strut interposed between said second web ends; one of said pieces having a threaded body portion; a cylindrical end adjacent said threaded portion having an outside diameter that is less than the root diameter of said threaded portion; an axial slot formed in said cylindrical end engaging the semi-circular end of the web of one of said shoes; the other end of said one piece having a flat semi-circular slot engaging the semi-circular end of the web of the other shoe; the other piece of said two-piece strut having an internally threaded portion engaging the threaded portion of said one piece; said other piece having a flared end adjacent the slotted cylindrical end of said one piece and rotatably engaging the semi-circular web end of said one shoe; said other piece having spaced apart radial flanges formed at each of its ends; said flanges each having a serrated periphery; a retractor spring secured between said shoe webs and drawing said second pair of adjacent web ends into engagement with said extendable strut; the body of said spring engaging the serrated edges of said flanges.

2. A brake assembly having a backing plate; an anchor pin and a hydraulic wheel cylinder secured to said backing plate; a pair of radially movable arcuate brake shoes secured to said backing plate; said shoes being of identical interchangeable configuration and each having a sheet metal reinforcing web; said shoe webs having one pair of adjacent ends engaging said anchor pin; spring means urging said shoe webs into engagement with said anchor pin; said wheel cylinder operatively engaging said shoe webs near said one pair of adjacent ends; said shoe webs having a second pair of adjacent ends; said second web ends each having flat semi-circular portions oriented in opposed relationship; a two-piece extendable strut interposed between said second web ends; one of said pieces having a threaded body portion; a cylindrical end adjacent said threaded portion having an outside diameter that is less than the root diameter of said threaded portion; an axial slot formed in said cylindrical end engaging the semi-circular end of the web of one of said shoes; the other end of said one piece having a flat semi-circular slot engaging the semi-circular end of the web of the other shoe; the other piece of said two-piece strut having an internally threaded portion engaging the threaded portion of said one piece; said other piece having a flared end adjacent the slotted cylindrical end of said one piece and rotatably engaging the semi-circular web end of said one shoe; a retractor spring secured between said shoe webs and drawing said second pair of adjacent web ends into engagement with said extendable strut; said other piece having a serrated radial flange in engagement with said retractor spring.

References Cited in the file of this patent

UNITED STATES PATENTS

| | | |
|---|---|---|
| 1,989,208 | McConkey | Jan. 29, 1935 |
| 2,051,867 | La Brie | Aug. 25, 1936 |
| 2,060,885 | McConkey | Nov. 17, 1936 |